United States Patent [19]

Bodin et al.

[11] 4,163,229

[45] Jul. 31, 1979

[54] COMPOSITE SYMBOL DISPLAY APPARATUS

[75] Inventors: Leslie J. Bodin, Stonybrook; Francis C. Marino, Dix Hills, both of N.Y.

[73] Assignee: Burroughs Corporation, Detroit, Mich.

[21] Appl. No.: 870,298

[22] Filed: Jan. 18, 1978

[51] Int. Cl.² ............................................ G06K 15/20
[52] U.S. Cl. .................................... 340/745; 340/751; 340/799
[58] Field of Search ................ 340/324 AD, 745, 751, 340/799

[56] References Cited

U.S. PATENT DOCUMENTS

| | | | |
|---|---|---|---|
| 3,750,135 | 7/1973 | Carey et al. | 340/324 AD |
| 3,821,730 | 6/1974 | Carey et al. | 340/799 X |
| 3,868,672 | 2/1975 | Johnson | 340/324 AD |
| 3,896,428 | 7/1975 | Williams | 340/324 AD |
| 3,978,470 | 8/1976 | McGuire | 340/799 X |
| 3,999,167 | 12/1976 | Ito et al. | 340/751 X |

Primary Examiner—David L. Trafton
Attorney, Agent, or Firm—Hane, Roberts, Spiecens & Cohen

[57] ABSTRACT

In a display device having a record medium which is parallel-line raster scanned by a beam which is intensity modulated to form matrices of dots representing symbols, apparatus is provided to generate composite symbols such as characters with diacritical marks. The apparatus includes a source of groups of coded combinations of bits representing symbols with each group having a first part representing the character and a second part the diacritical mark. A first addressable memory stores the binary signals representing the dots of the character while a second addressable memory stores the binary signals representing the dots of the diacritical marks. Thus, each symbol group addresses two memories which then feed these binary signals to the beam which is intensity modulated to form a matrix of dots on the record medium. In addition provision is made to vertically displace the characters to perform subscripting and superscripting.

10 Claims, 5 Drawing Figures

TIMER-TM

COMPOSITE SYMBOL DISPLAY APPARATUS

BACKGROUND OF THE INVENTION

This invention pertains to display systems and more particularly to display systems which display symbols formed by assembling rows of indicia.

One of the most common types of symbol display systems utilizes a device which scans a record medium with a horizontal line raster such as used in commercial television. The most typical of such display systems employs a cathode ray tube wherein a beam of electrons is intensity modulated while raster scanning the phosphor coated face of the tube. Other display systems can use a laser or other light source as the source beam and a xerographic drum or photographic film as the record medium. Non-radiation type sytems use ink jets aimed at a paper record medium. In any of these display systems the symbols are formed by either generating adjacent lines of varying length or more commonly by assembling arrays of rows of dots to form a dot matrix.

Typically in such systems a memory stores a representation of the dot matrix for each symbol to be displayed. Thus for example if a symbol is represented by suitable dots in a 8×16 matrix and there are 128 symbols to the font considerable memory space is required. When foreign language fonts having characters with diacritical marks, or fonts having underlinable symbols or fonts having superscripts, subscripts and the like are used the memory size also increases.

SUMMARY OF THE INVENTION

It is a general object of the invention to provide an improved display system for a wide variety of symbols.

Briefly, the invention contemplates a display system having a display device wherein each symbol is displayed as a set of rows of indicia. These are sequentially fed from a source of groups of coded combinations of signals, each group representing a symbol to be displayed. Each group has a first sub-group representing a basic symbol such as an alphanumeric and a second sub-group representing a possible modification such as diacritical marking, underlining and subscripting. The signals of the first sub-groups are fed to a first memory which stores the sets of rows of indicia representing the basic symbols and the second sub-groups associated with diacritical marks and the like are fed to a second memory which stores the sets of rows of indicia representing such marks. When each memory receives a sub-group it transfers in an ordered manner the appropriate sets of rows of indicia to the display device.

BRIEF DESCRIPTION OF THE DRAWING

Other objects, the features and advantages of the invention, will be apparent from the following detailed description when read with the accompanying drawing which shows by way of example and not limitation apparatus for practicing the invention. In the drawing.

DESCRIPTION OF THE PREFERRED EMBODIMENT

Figure 1:
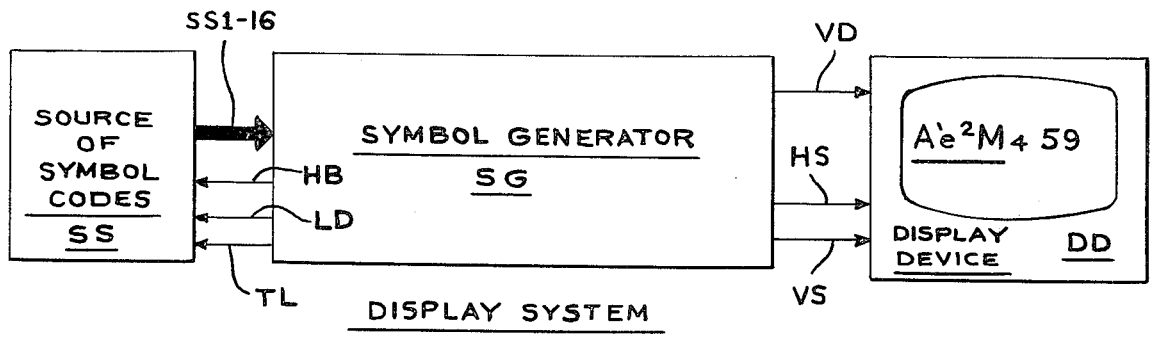
FIG. 1 is a block diagram of a display system incorporating the invention.

In FIG. 1 the outputs of source of symbol codes SS are connected via the sixteen-line cable SS1-16 to inputs of symbol generator SG whose information output is connected via line VD to a display device DD. Source of symbol codes SS which is hereinafter fully described stores blocks of symbol codes wherein each block contains the symbol codes for one line of text (text line) followed by an end of line symbol code. For the present example, each symbol code is a coded combination of sixteen bits and it will be assumed that up to eighty characters can be displayed on a text line. Source SS will deliver the next symbol code of the block in response to a signal on line LD starting with the first symbol code of the block and will return to the first symbol of the block whenever a signal is received from line HB. Whenever a signal is present on line TL a new block of symbol codes will be available for transfer to symbol generator SG.

The display device DD can be a conventional CRT display having an electron beam which is driven to perform a horizontal line raster scan on the phosphor screen in response to the usual horizontal sync signals on line HS and vertical sync signals on line VS from symbol generator SG. While the scan is being performed the signals on line VD turns the electron beam of the CRT on and off.

Figure 2:
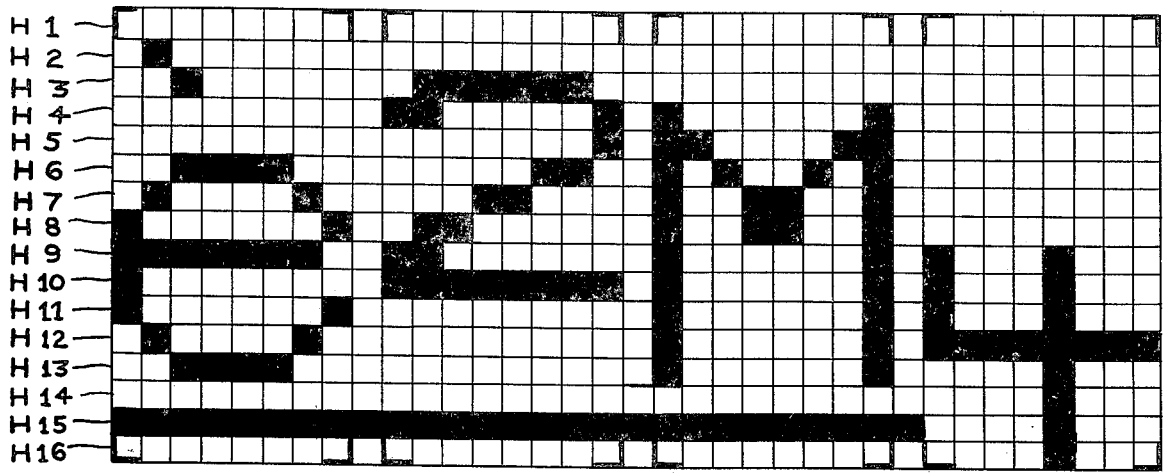
FIG. 2 shows a portion of a line of displayed symbols in accordance with the invention.

The symbol generator SG converts the symbol codes on cable SS1-16 to a series of signals on line VD representing dots. For the present example, it will be assumed that each symbol can be constructed from a matrix of dots which has sixteen rows and eight columns. Thus each line of text on the screen of the display device DD will require sixteen of the horizontal raster lines (scan lines). In FIG. 2 there is shown a portion of the line of text on the screen of the display device DD. It is seen that each symbol is assigned a region of sixteen horizontal scan lines with eight pixels per line and a single pixel between symbols to provide intersymbol spacing. Furthermore, it has been arranged that the actual site of a basic symbol like the character M occupies the scan lines H3 to H13 so that the base line of alphanumerics is the scan line H13. Of course the descenders of character line g and y extend into the scan lines H14 to H16.

In many foreign languages some of characters include diacritical marks to change the pronounciation of the characters. For example, in German there is an umlaut which can be placed over any of the vowels. Thus, one diacritical mark can be used for many characters. On the other hand, in French a vowel such as e can have one of three different diacritical marks, the grave accent, the acute accent or the circumflex accent. The first is shown in FIG. 2. Thus one character can have one of several diacritical marks. Another possibility is that alphanumerics are underlined. See the e, 2 and M of FIG. 2. Thus, it is seen that one can make composite symbols, e.g. vowels with diacritical marks, alphanumerics which are underlined, etc., by combining a basic symbol with a supplementary mark symbol. A further possibility is that an alphanumeric can be used as a superscript or a subscript for another alphanumeric. In FIG. 2 it is seen that the numeral 2 is a superscript for the character e while the numeral 3 is a subscript for the character M. Thus, it can be seen that any basic symbol can be modified, e.g., either by making it a composite symbol or shifting its vertical position on a line. The symbol generator SG includes apparatus for performing these modifications when instructed to do so.

The way to generate these instructions is to divide the sixteen bits of a symbol code into several sets. A first set including the bits positions 1 to 7 contain the code for a basic symbol, e.g. an alphanumeric. These bits will be represented by signals of lines SS1 to SS7. A second set including the bit positions 8, 9 and 10 contain the code for a supplementary mark, e.g. a diacritical mark. These bits will be represented by signals on lines SS8 to SS10. Other sets can be used to indicate other attributes. For example, the bit position 14 (line SS14) indicates the basic symbol is a superscript; bit position indicates a subscript; and bit position 16 indicates the basic symbol is to be underlined.

With this in mind a text line of symbols is generated in the following manner. During the horizontal scan line H1 every symbol code of the block stored source SS is read out sequentially to the symbol generator SG which uses the symbol code plus a scan line count to transmit dot code signals of the top row of each symbol matrix to the display device DD. When this horizontal scan line is completed, the horizontal scan line H2 begins and the same block of symbol codes is again transferred from source SS to the symbol generator SG which uses the symbol codes plus the new line count to transmit dot code signals for the next to the top row of each symbol matrix to the display device DD. After sixteen such operations a new block of symbol codes is made available from source SS and the next text line (horizontal scan lines H17 to H32) is displayed in a similar manner.

Figure 3:
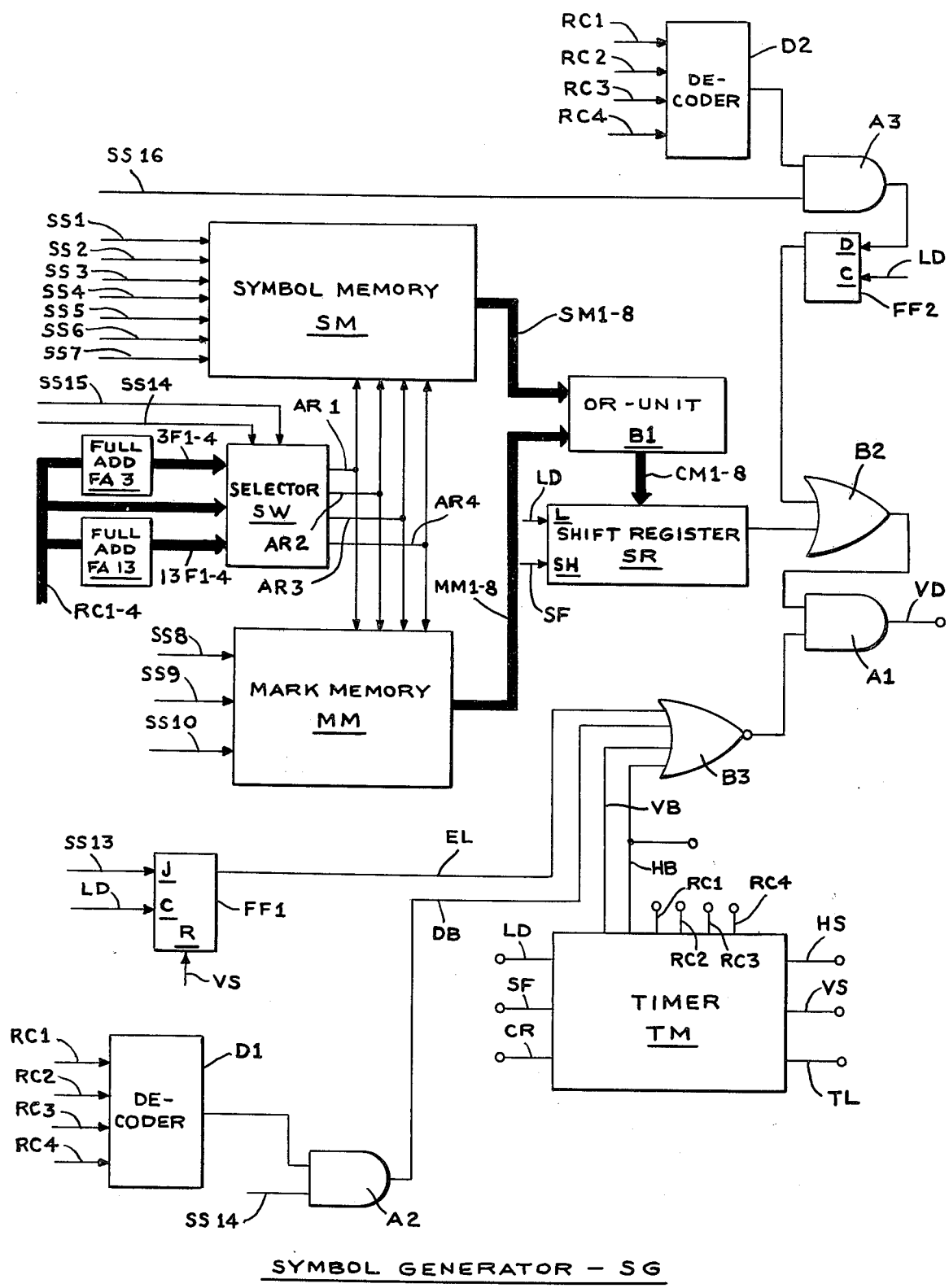
FIG. 3 shows the details of the symbol generator of FIG. 1.
Figure 4:
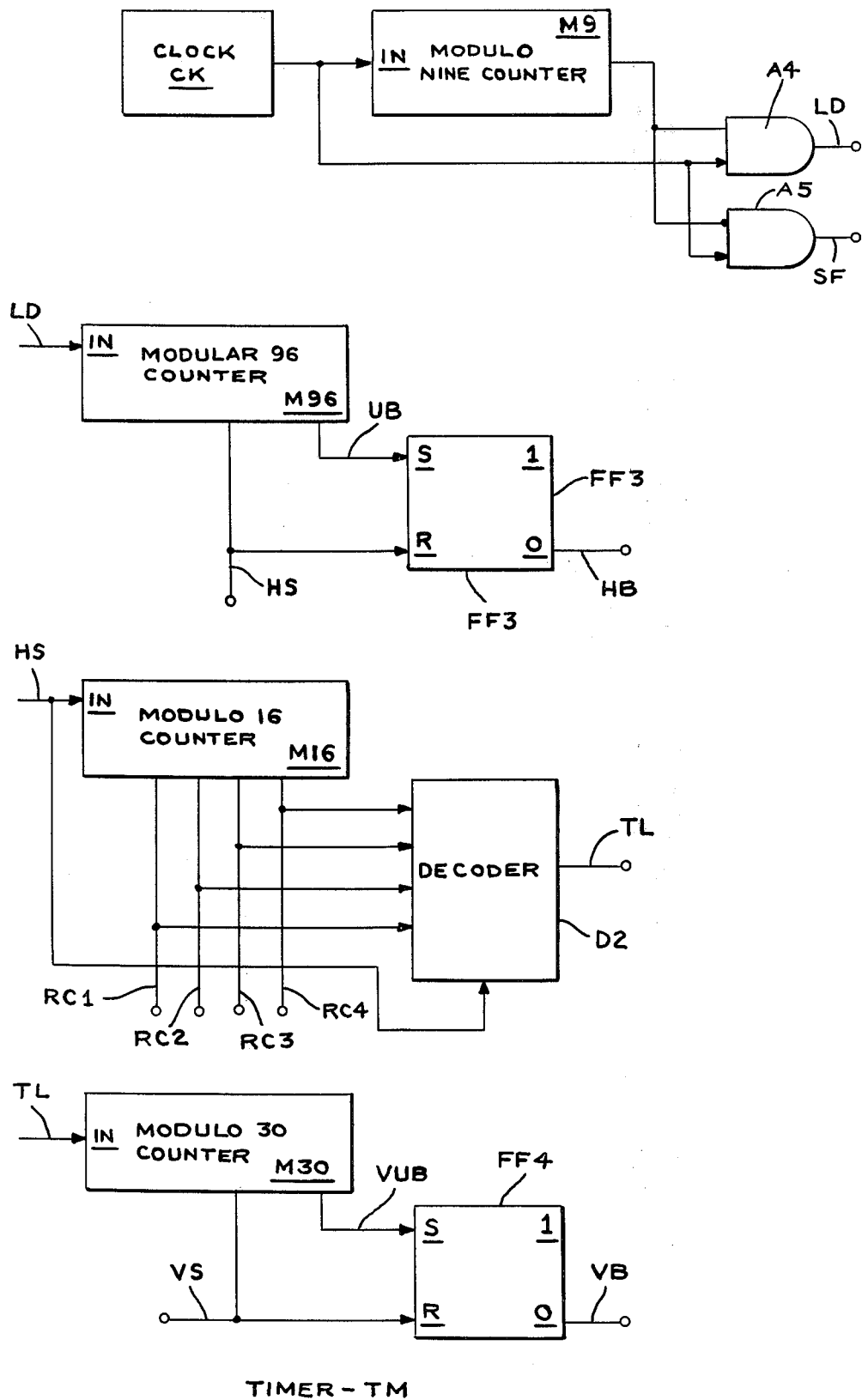
FIG. 4 shows the details of the timer of FIG. 3.

The symbol generator SG shown in FIG. 3 includes the timer TM which generates thhe synchronizing and other signals. In particular, and with making reference to FIG. 4 a free running clock pulse generator CK establishes the dot frequency and the length of the pixels. The output of the clock generator is fed to the input of modulo-9 counter M9 whose output delivers a pulse for each nine clock pulses received. The output of counter M9 is fed to a direct input of AND-circuit A4 and an inverting input of AND-circuit A5. The other input of each AND-circuit is connected to the output of clock pulse generator CK. The output of AND-circuit A4 delivers one pulse on line LD for every nine clock pulses. This pulse represents a symbol pulse as well as the space between symbols. Between each pair of pulses on line LD there are eight pulses on line SF connected to the output of AND-circuit A5. These eight pulses are related to the dot signals in the row of a dot matrix.

The symbol pulses on line LD are counted by modulo-96 counter M96. The count has a first output which emits a pulse on line VS when the accumulated count reaches 80 and a second output which emits a pulse onto line UB when the accumulated count reaches 96. The signal on line UB sets flip-flop FF3 and the signal on line HS clears the flip-flop FF3. The signal on line HB connected to the O-output of the flip-flop is the horizontal blanking signal and the signal on line HS the horizontal sync signal for the CRT device of the display device DD. Thus, each HS signal generates one horizontal scan line.

The signals on line HS are counted in modulo-16 counter M16, the outputs of the four stages within the counter are connected to the lines RC1, RC2, RC3 and RC4. The four outputs are fed to decoder D2 which emits a pulse on line TL whenever the count reaches sixteen to indicate the completion of the scan of a text line. Note that coded combinations of signal on the lines RC1 to RC4 indicate the instantaneous value of the scan line number within the text line.

The signals on line TL are counted by modulo thirty counter M30 which emits a pulse on an output connected to line VS when the accumulated count reaches twentyfour and a pulse on an output connected to line UVB when the count reaches thirty. These lines UVB and VS are connected to the set and clear terminals respectively of flip-flop FF4 whose O-output is connected to line VB. The signal on line VB is the vertical blanking signal for the CRT device and the signal on line VS the vertical sync signal. Thus after twenty four text lines the raster is repeated.

With this understanding of the timing the symbol generator SG which is shown in FIG. 3 and centers around the symbol memory SM and the mark memory MM will now be described. The symbol memory SM is a conventional read only memory (ROM) having 128 sets of registers. Each set of registers has sixteen eight-bit registers. Each set is associated with one of the basic symbols and the sets are selected by means of the signals on lines SS1 to SS7 of the cable SS1-16 for transferring the first seven bit positions of a symbol code. Each of the sixteen eight-bit registers of a set store the dot signals for one of the sixteen rows of the symbol matrix. The particular register of a set is chosen by the signals on lines AR1 to AR4 which are related to the scan lines within a text line. The eight dot signals of the chosen register are fed in parallel via the right lines of cable SM1-8 to OR-unit B1.

The mark memory MM is similar to the symbol memory SM except that it consists of eight sets of sixteen eight-bit registers which store the supplementary marks. The sets are selected by means of the signals on lines SS8, SS9 and SS10 of the cable SS1-16 associated with the supplementary marks. Again the particular register of a set is selected by the signals on lines AR1 to AR4. The eight dot signals of the chosen register are fed in parallel via the eight lines of cable MM1-8 to OR-unit B1. OR-unit B1 can be eight two input OR-circuits each satisfying the following Boolean equation:

$$CM_n = SM_n + MM_n \text{ (where } 1 \leq n \leq 8).$$

The eight lines of the cable CM1-8 are connected to eight parallel gated-inputs of shift register SR. The eight dot signals of the selected registers of the memories are loaded under the control of a signal on line LD connected to the gating input L into the eight positions of the shift register SR and serially shifted out by eight subsequent shift pulses on line SF connected to the shifting input SH. (Note because of the OR-unit B1 the matrices of the basic symbols overlay those of the mark symbols and in this way the composite symbols are obtained.) The output of the shift register SR is connected via OR-circuit B2 and AND-circuit A1 to line VD.

The generation of the signals on lines AR1 to AR4 which select the rows of the dot matrices and consequently the position of a row of dots on a text line is performed by selector SW. The selector SW can be a logical network satisfying the following Boolean Equation:

$$AR_n = [RC_n \cdot (\overline{SS14} + \overline{SS15})] + [3F_n \cdot SS15] + [13-F_n \cdot SS14] \text{ (where } 1 \leq n \leq 4)$$

The signals on lines RC1 to RC4 of four-line cable RC1-4 represent the actual horizontal scan line of a text line, i.e., for the text line of FIG. 1 the binary coded combinations of the signals on the lines RC1 to RC4 represent the lines H1 to H16. Thus when the lines RC1 to RC4 are connected directly to the lines AR1 to AR4 there is no vertical shifting of the rows of dots.

When superscripting is called for the symbol code for the symbol to be superscripted will contain a bit in the fifteen position. Thus line SS15 of the cable SS1-16 will carry a signal causing selector SW to connect lines 3F1, 3F2, 3F3 and 3F4 of the four-line cable 3F1-4 to lines AR1, AR2, AR3 and AR4, respectively. The lines 3F1 to 3F4 are connected to the sum outputs of conventional four-bit full adder FA3. The augend inputs of the adder FA3 are connected to lines RC1 to RC4; and the addend inputs are permanently wired to bias levels which represent a count of three. Thus, the count of each scan line is incremented by three so that the memories will select rows of the matrix three scan lines earlier then normal. The effect is that the entire symbol is raised three scan lines as can be seen with the numeric 2 of FIG. 2. Note the baseline of the numeric is three scan lines above the normal baseline which is line H13.

In a similar manner subscripting is obtained during the occurrence of a signal on line SS14, in which case the lines 13F1, 13F2, 13F3 and 13F4 of fourline cable 13F1-4 are connected to lines AR1, AR2, AR3 and AR4, respectively. In this case full adder FA13 adds a value of thirteen to the line count represented by the signals on lines of cable RC1-4. (Note by adding 13 to a number whose maximum value can be 16 is equivalent to subtracting three from the number.) Thus any symbol is lowered three scan lines. See numeric 4 of FIG. 2. When subscripting there is the chance of vertical rollover of the descenders of any symbols whereby the descenders may be seen at the top of the character. Thus, one should not use symbols with descenders as subscripts. However to insure that no such rollover is displayed, decoder D1 samples the lines of cable RC1-4 for representations of line counts for H1, H2 and H3 i.e., the first three scan lines of a text line. If during a subscripting as indicated by a signal of line SS14 at AND-circuit A2, the decoder indicates one of these three lines is being scanned, a signal is fed via line DB to an inverting OR-circuit B3 whose output blocks AND-circuit A1 preventing the transmission of dot signals onto line VD.

Other blocking of the AND-circuit A1 occurs during the usual horizontal blanking interval during horizontal retrace of the CRT scans as indicated by the signal on line HB. The signal on line VB provides blanking during the vertical release interval. If the block of the symbols is shorted than eighty symbols the last symbol of the block will be an end of line code as indicated by a signal on line SS13 of the cable SS1-16. This signal will set flip-flop FF1 which starts emitting a signal on line EL until it is cleared by a signal on the line VS at the end of the scan line. The signal on line EL is fed to OR-circuit B3 to block AND-circuit A1.

In FIG. 2 it is seen that the first three symbols are underlined, i.e., the equivalent of a row of dots are present in line H15 for each symbol. Note also that the underline includes the intersymbol gap. Whenever an underline is desired the sixteenth bit position of a symbol code will be marked and a signal will be present on line SS16 of cable SS1-16. This signal alerts AND-circuit A3 whose other input is connected to the output of decoder D2 whose inputs are connected to lines RC1 to RC4. Whenever decoder D2 detects a count of fifteen indicating the fifteenth scan line of the text line is present a signal fed to the input of flip-flop FF2 which is a latch that is sampled by signals on line LD. It should be recalled that these signals occur during the space between symbols. When the flip-flop is set it remains set until a symbol code is received without its 16th bit position being marked. The output of the flip-flop FF2 is fed via OR-circuit B2 and AND-circuit A1 to line VD.

Figure 5:
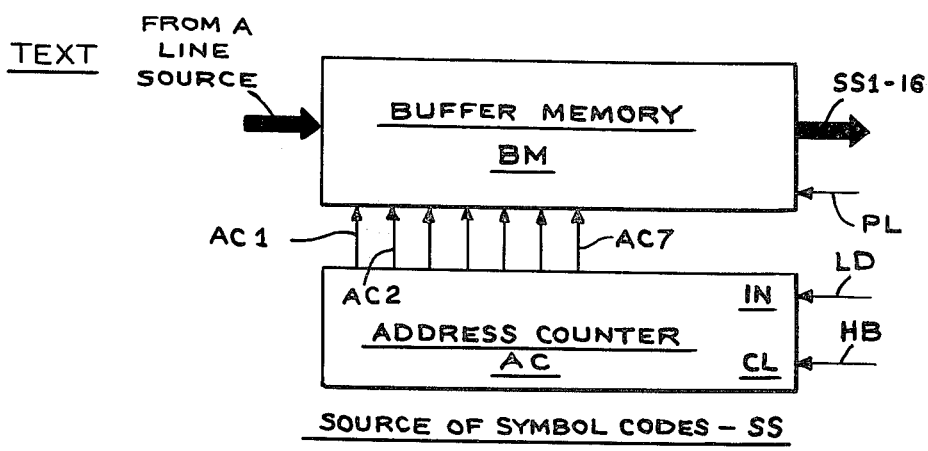
FIG. 5 is a simplified block diagram of the source of symbol codes of FIG. 1.

The source of symbols SS is shown in FIG. 5 comprising a buffer memory BM which can be a RAM having eighty sixteen-bit registers which are addressed by signals on lines AC1 to AC7 from address counter AC. The address counter counts character or symbol signals on line LD and is cleared by the trailing edge of the HB signal which is at the start of every scan line. The outputs of the memory are connected to the lines of cable SS1-16.

Whenever, the memory must be loaded a new block of symbols is entered via a text line source (not shown) which also operates the counter by providing its own incrementing and clear signals during horizontal blanking intervals. If the memory is not sufficiently fast to unload in such intervals one can use conventional double bucketing techniques such as shown in U.S. application Ser. No. 851,813 filed Nov. 16, 1977.

While only one embodiment of the invention has been shown and described in detail there will now be obvious to those skilled in the art many modifications and variations satisfying many or all of the objects of the invention without departing from the spirit thereof as defined by the appended claims.

What is claimed is:

1. In a display system having a display device wherein each symbol is displayed as a set of rows of indicia, apparatus for transferring the rows of indicia to the display device comprising a source of groups of coded combinations of signal each representing a symbol to be displayed, each group having a first sub-group actually respresenting a basic symbol and a second sub-group representing a possible modification of the basic symbol, a first memory means having a plurality of storage locations for storing the sets of rows of indicia representing the basic symbols, a second memory means having a plurality of storage locations for storing sets of rows of indicia representing supplementary marks associated with some of the basic symbols, means for transferring the first sub-group of each group of coded combinations of signals to said first memory means for selecting for transfer to the display device the rows of indicia of a basic symbol and the second sub-group of each group of coded combinations of signals to said second memory means for selecting for transfer to the display device the rows of indicia of a supplementary mark whereby a modified symbol is displayed in response to the emission of one group of a coded combination of signals by said source.

2. The apparatus of claim 1 wherein the rows of indicia are rows of dots.

3. The apparatus of claim 2 wherein the format of each displayed symbol comprises of matrix of dots with the central rows being assigned to the basic symbol and further comprising timing means for controlling the transfer of the rows of dots of a basic symbol to occur when the central rows of the matrix of dots for the basic symbol are to be displayed.

4. The apparatus of claim 3 wherein the format of some displayed symbols have supplementary marks in any of said rows and wherein said timing means controls the transfer of the rows of dots for a supplementary mark.

5. The apparatus of claim 3 wherein said timing means includes means for controlling the transfer of the rows of dots of a basic symbol to start at a time different from the central rows of the matrix are normally to be displayed.

6. In a display system for displaying at least one line of symbols having a record medium which is scanned in a parallel line raster of at least m scan lines by an intensity-modulated source beam which can change the state of the regions of the record medium upon which the beam impinges and wherein each symbol to be displayed is represented by a dot matrix on m rows and n columns with most symbols occupying the central p rows and having at least the top q rows free of dots, apparatus for transmitting to the source beam binary signals for intensity modulating the source beam to generate dots on the record medium while scanning the m scan lines comprising: source means for sequentially emitting groups of coded combinations of bits, each of said groups representing a symbol to be displayed, each of said groups having a first set of bits representing a basic symbol and a second set of bits representing a possible modification of the basic symbol; row counting means operating in synchronism with the generation of the scan lines of the parallel line raster for generating sets of row address bits related to the rows of the dot matrix; a first memory means having a plurality of sets of first addressed registers, each of said sets of first addressed registers being associated with a particular basic symbol, each of said first addressed registers storing the binary signals associated with a particular row of dots of the particular basic symbol and each of said first addressed registers being selectable to transfer its contents in response to the receipt of its associated first set of bits and its associated set of row address bits; a second memory means having a plurality of sets of second addressed registers, each of said sets of second addressed registers being associated with a particular supplementary mark for a basic symbol, each of said second addressed registers storing the binary signals associated with a particular row of dots of the particular supplementary mark, and each of said second addressed registers being selectable to transfer its contents in response to the receipt of its associated second set of bits and its associated set of row address bits; means for connecting said source means to said first memory means so that said first sets of bits are fed thereto; means for connecting said source means to said second memory means so that said second sets of bits are fed thereto; means for connecting said row counting means to said first and second memory means so that said sets of row address bits are fed to both said memory means; and means for connecting said first and second memory means to said source beam so that the binary signals stored in the first addressed register selected by the coincidence of a first set of bits and a set of row address bits is fed to the source beam and the binary signals stored in the second addressed register selected by the coincidence of a second set of bits and a set of row address bits is also fed to the source beam to generate a modified symbol.

7. The apparatus of claim 6 wherein at least one of said groups of coded combinations of bits emitted by said source means includes a third set of bits and wherein said means for connecting said row counting means to said first memory means comprises arithmetic means responsive to the presence of said third set of bits for changing by a given number the value represented by the set of row address bits being transmitted to said first memory means so that the basic symbol represented by said one group is vertically displaced when being displayed on the record medium.

8. The apparatus of claim 7 wherein the value is incremented so that the symbol is raised to form a superscript.

9. The apparatus of claim 8 wherein the value is effectively decremented so that the symbol is raised to form a subscript.

10. The apparatus of claim 6 further comprising regularly occurring shift pulse generating means for sequentially transmitting the binary signals stored in each selected register to said source means, said shift register means emitting n shift pulses for transmitting the binary signals and one pulse during which no binary signal transmission occurs so as to provide an intersymbol space on the record medium, some of said groups of coded combinations of bits emitted by said source means including a fourth set of bits, means responsive to the presence of the fourth set of bits for transmitting a binary signal to the source during one of the symbol rows which is present for $n+1$ shift pulse times so that the symbol being displayed and an adjacent intersymbol space are underlined.

* * * * *